(12) United States Patent
Hedrick et al.

(10) Patent No.: US 11,975,861 B2
(45) Date of Patent: May 7, 2024

(54) RETROFIT AIRCRAFT AUTOTHROTTLE CONTROL FOR AIRCRAFT WITH ENGINE CONTROLLERS

(71) Applicant: INNOVATIVE SOLUTIONS & SUPPORT, INC., Exton, PA (US)

(72) Inventors: Geoffrey S. M. Hedrick, Malvern, PA (US); Shahram Askarpour, Downington, PA (US); Markus Knopf, Chester Springs, PA (US)

(73) Assignee: INNOVATIVE SOLUTIONS & SUPPORT, INC., Exton, PA (US)

( * ) Notice: Subject to any disclaimer, the term of this patent is extended or adjusted under 35 U.S.C. 154(b) by 0 days.

(21) Appl. No.: 17/972,410

(22) Filed: Oct. 24, 2022

(65) Prior Publication Data
US 2023/0126535 A1  Apr. 27, 2023

Related U.S. Application Data

(60) Provisional application No. 63/271,044, filed on Oct. 22, 2021, provisional application No. 63/294,014, filed on Dec. 27, 2021.

(51) Int. Cl.
*B64C 31/00* (2006.01)
*B64C 19/00* (2006.01)
*B64D 31/06* (2006.01)

(52) U.S. Cl.
CPC .............. *B64D 31/06* (2013.01); *B64C 19/00* (2013.01); *F02D 2200/60* (2013.01)

(58) Field of Classification Search
CPC ......... B64D 31/06; B64C 19/00; B64C 19/02; B64C 31/00; F02D 2200/60
USPC ............................................................ 701/99
See application file for complete search history.

(56) References Cited

U.S. PATENT DOCUMENTS

| | | | |
|---|---|---|---|
| 6,880,784 B1* | 4/2005 | Wilkinson | G05D 1/0661 |
| | | | 244/76 R |
| 10,106,269 B1* | 10/2018 | Thornton | B64D 45/00 |
| 2019/0055028 A1* | 2/2019 | Martindale | B64D 31/06 |
| 2020/0130855 A1* | 4/2020 | Zingaro | B64D 31/08 |
| 2020/0348694 A1* | 11/2020 | Ceparu | B64C 13/18 |
| 2021/0016871 A1* | 1/2021 | Landers | B64C 9/18 |
| 2023/0002623 A1* | 1/2023 | Hedrick | B64D 31/08 |

FOREIGN PATENT DOCUMENTS

EP  3647568  5/2020

OTHER PUBLICATIONS

Search Report with Written Opinion dated Sep. 12, 2023 issued in International Patent Application No. PCT/US2022/047605.

* cited by examiner

*Primary Examiner* — Shardul D Patel
(74) *Attorney, Agent, or Firm* — Cozen O'Connor

(57) ABSTRACT

An autothrottle system to be interfaced with a full-authority digital engine control (FADEC) system having a command input that receives sensed power-control input (PCL) position signaling indicative of a manual throttle setting for an aircraft. The autothrottle system generates automated power command signaling that is synthesized to virtualize electrical characteristics of the sensed PCL position signaling such that the automated power command signaling is recognized by the FADEC system as sensed PCL position signaling.

19 Claims, 9 Drawing Sheets

RETROFIT AIRCRAFT AUTOTHROTTLE CONTROL FOR AIRCRAFT WITH ENGINE CONTROLLERS

PRIOR APPLICATIONS

This application claims the benefit of U.S. Provisional Application No. 63/271,044, filed Oct. 22, 2021, and U.S. Provisional Application No. 63/294,014, filed Dec. 27, 2021, the disclosures of each which are incorporated by reference herein.

TECHNICAL FIELD

The invention relates generally to aeronautics and aircraft control and, more particularly, to automatic throttle control for reducing pilot workload and maintaining safe flight characteristics.

BACKGROUND

Automatic throttle systems for aircraft, commonly referred to as autothrottles, are systems that control an aircraft's engines with minimal pilot intervention. Such autothrottles provide the ability to realize truly automated, hands-off control of the aircraft, thus providing increased aircraft operating efficiencies, reducing cost in, for example, the consumption of fuel, and vastly decreasing pilot workload and thereby notably increasing flight safety. Autothrottles are ubiquitous on large or sophisticated high-end aircraft, such as airline passenger jets, advanced regional and general aviation jets, and advanced turbine-propeller airplanes, which generally incorporate an autothrottle as part of a comprehensive flight management system (FMS). The FMS also provides autopilot control with lateral navigation (LNAV) and vertical navigation (VNAV), which may control the aircraft along its flight plan and maintain its operation within a safety envelope. FMS's are comprehensive systems that are fundamentally integrated into the aircraft by the aircraft's manufacturer, and comprise a variety of sensors and actuators throughout the aircraft to assess the aircraft's configuration, position, orientation, speed, altitude, and performance, among other monitored parameters.

Due to the complexity and cost of FMS's, such systems have traditionally been considered impractical for smaller aircraft, such as those used for general aviation. Small aircraft may include aircraft with single or multiple engines using pistons or turbines (e.g., light aircraft or very light jet (VLJ)), and which generally accommodate 10 or fewer passengers. Typically small aircraft have a maximum takeoff weight (MTOW) of under 15,000 pounds (6,800 kg). Although small aircraft may include disparate systems such as an autopilot, GPS-based navigation, and others, such systems tend to be offered as options by aircraft manufacturers, or retrofitted to an existing aircraft, and hence are generally not integrated into a complete FMS. Also, certain sensors used by an FMS, such as a radar-based altimeter, redundant airspeed sensors, and the like, are typically absent from small aircraft, further complicating the addition of an FMS.

U.S. patent application Ser. No. 17/675,534, entitled "PILOT INTERFACE FOR AIRCRAFT AUTOTHROTTLE CONTROL," the disclosure of which is incorporated by reference herein, describes an autothrottle system suitable for use in small aircraft that determines a control-target setting for a throttle of an aircraft and dynamically adjusts the throttle according to a control-target setting. The autothrottle system may implement an autothrottle control program, and control an autothrottle actuator to set and dynamically adjust a throttle setting that automatically controls engine power of the aircraft. The autothrottle control program may set and dynamically adjust the throttle setting according to different ones of a plurality of autothrottle control modes, where each of the autothrottle control modes defines a corresponding control-target setting.

Small aircraft, particularly small multi-engine aircraft, often employ a full-authority digital engine control (FADEC) system, which automates the control of various engine parameters during flight based on a set of monitored settings and conditions, to provide optimal or near-optimal engine efficiency. For instance, a FADEC system may control fuel flow, stator vane position, air bleed valve position, and other such parameters, based on flight condition including air density, throttle lever position, engine temperatures, engine pressures, and other such parameters. The FADEC system may also enforce certain constraints, such as keeping the engine temperature below operational limits.

It would be desirable to incorporate an autothrottle system in a small aircraft that is equipped with a FADEC system, particularly as a retrofit installation. However, this presents a number of challenges. For example, known autothrottle systems that work with non-FADEC aircraft tend to integrate with the power control lever (PCL) and work to adjust the fuel control to the aircraft's engine(s). However, this (and myriad other) functionality is the province of a FADEC system. When the retrofit autothrottle is engaged, it would be detrimental for the autothrottle system to displace the functionality of the FADEC system.

Conventionally, displacing the FADEC system by the autothrottle system would result in either bypassing the FADEC system's functionality, or replacing that functionality with the addition of substantial complexity to the autothrottle system. Omitting or overriding the FADEC system's functionality is clearly not desirable since the engine optimization and operational-envelope-limiting functions are highly important. The addition of complexity to the autothrottle system to take over the FADEC system's functionality substantially increases the expense of development, qualification, and installation of such a system, and there would be little market demand for such autothrottle systems to be retrofitted into aircraft that already have a FADEC system. In addition, in any retrofit system it is highly desirable to preserve the existing operational procedures. The addition of an autothrottle system that overrides the existing FADEC system tends to complicate the operational procedures to be mastered by the flight crew.

For these, and other, reasons, a practical solution for integrating retrofit autothrottle systems with FADEC-enabled aircraft is needed.

SUMMARY OF THE DISCLOSURE

One aspect of this disclosure is directed to an autothrottle system to be interfaced with a full-authority digital engine control (FADEC) system having a command input that receives sensed power-control input (PCL) position signaling indicative of a manual throttle setting for an aircraft. The autothrottle system generates automated power command signaling that is synthesized to virtualize electrical characteristics of the sensed PCL position signaling such that the automated power command signaling is recognized by the FADEC system as sensed PCL position signaling.

According to an embodiment, an aircraft is equipped with a full-authority digital engine control (FADEC) system having a command input that receives sensed power-control input (PCL) position signaling indicative of a manual throttle setting. An autothrottle controller, which may be retrofit into the aircraft, includes processing circuitry, memory, and input/output facilities. The autothrottle controller is operative to execute instructions including an autothrottle control program. The autothrottle controller includes an input operative to receive sensed PCL position signaling and to output automated power command signaling.

A FADEC interface is electrically coupled to the autothrottle controller and to the FADEC system, and is controllable by the autothrottle controller to select from among the sensed PCL position signaling and the automated power command signaling to be coupled to the command input in response to an autothrottle engagement signal from the autothrottle controller. The autothrottle control program, when executed, causes the autothrottle controller to determine a control-target setting and to generate the automated power-command signaling according to the control-target setting when the system is in an engaged state for autothrottle control. The autothrottle controller is likewise operative to generate the autothrottle engagement signal when the system is in the engaged state for autothrottle control.

The automated power command signaling is generated by the autothrottle controller according to the autothrottle control program, and is synthesized to virtualize electrical characteristics of the sensed PCL position signaling such that the automated power command signaling is recognized by the FADEC system as sensed PCL position signaling.

Related aspects of the subject matter include instructions (stored on at least one tangible, non-transitory machine-readable medium) that are executable on a controller of an autothrottle system to perform the operations according to any of the methods described herein.

In a related aspect, a method for controlling an autothrottle of an aircraft equipped with a FADEC system having a command input that receives sensed power-control input (PCL) position signaling indicative of a manual throttle setting, is provided.

The method includes executing, by an autothrottle controller, instructions including an autothrottle control program, including determining a control-target setting. Further, the method includes receiving, by the autothrottle controller, sensed PCL position signaling, outputting, by the autothrottle controller, automated power command signaling that is based on the control-target setting, including synthesizing electrical characteristics of the sensed PCL position signaling such that the automated power command signaling is recognizable by the FADEC system as sensed PCL position signaling, and electrically selecting, under control of the autothrottle controller, from among the sensed PCL position signaling and the automated power command signaling, a throttle command signal to be coupled to the command input.

A number of advantages will become apparent from the following Detailed Description.

BRIEF DESCRIPTION OF THE DRAWINGS

The invention may be more completely understood in consideration of the following detailed description of various embodiments of the invention in connection with the accompanying drawings.

Figure 1A:
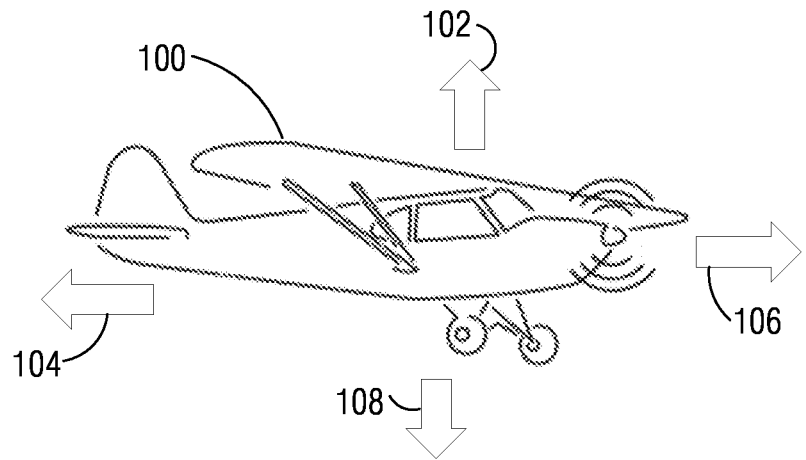
FIG. 1A is a simplified diagram illustrating an aircraft and basic forces involved in its flight.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

It should be noted that aspects of this disclosure are applicable in any powered aircraft, including traditional fuel-burning aircraft (propeller-driven, turboprop, jet, or other), electric aircraft (battery-, solar-, or fuel cell-powered), or hybrid-powered aircraft. In the following description, various embodiments are described in the context of one, or some, types of propulsion or propulsion-energy-delivery systems; however, it should be understood that principles of the described embodiments may be suitably applied to other types of aircraft having other propulsion or propulsion-energy-delivery systems with suitable adaptation which is within the skill of aircraft technologists.

FIG. 1A is a simplified diagram illustrating aircraft 100 and basic forces involved in its flight. Aircraft 100 generates lift 102 from its forward motion by directing air downward using primarily the shape and orientation of the body of aircraft 100 (e.g., its wings, fuselage, and control surfaces). Lift also depends on the density of the air, the square of the velocity, the air's viscosity and compressibility, the surface area over which the air flows. The dependence on body shape of aircraft 100 is complex and difficult to model mathematically. The effect of inclination of aircraft 100, air viscosity (e.g., due to air temperature, humidity, and altitude), and compressibility on the lift is variable and also difficult to derive for a given operating condition.

Drag 104 is a force that resists the forward motion of aircraft 100. Drag 104 has a number of components, such as aerodynamic friction between the air and the surface of aircraft 100 (skin friction), aerodynamic resistance to the motion of the aircraft 100 through the air (form drag), and drag caused by lift (induced drag), among others, which are likewise difficult to account for in order to compute drag predictively. Like lift 102, drag 104 depends on a number of complex factors, including the size, shape, and weight of aircraft 100, the surface properties of aircraft 100, fluid characteristics of the air, and other parameters. Notably, different parameters of drag 104 prevail at different airspeeds. At low airspeeds, a primary component of drag 104 is the induced drag. As aircraft 100 increases its airspeed, lift 102 is generated more easily, and the induced drag actually reduces. However, with increasing airspeed, the other drag components, collectively referred to as parasitic drag, increase.

Thrust 106 is the propulsion force generated by aircraft 100 to overcome drag 104. Generation of thrust requires consumption of fuel or other onboard energy source (e.g., electrical charge in the case of battery-powered aircraft). The magnitude of the thrust depends on a number of parameters relating to the propulsion system of aircraft 100, such as the type and quantity of engines, and the throttle setting(s). Weight 108 is a combination of gravity and the mass of aircraft 100, including the mass of the airframe, plus the mass of the fuel (which is a time-varying quantity in the case of fuel-consuming aircraft), plus any payload on board aircraft 100 (people, freight, etc., which may also be dynamically-varying as in the case of air-dropping operations). The dynamic variability of weight 108 means that the amounts of lift 102 and drag 104 also vary over time during the flight of aircraft 100.

The performance of aircraft 100 is limited by various physical constraints. For instance, the airspeed is practically limited by the aerodynamics and structural strength of the airframe of aircraft 100, as well as by the available thrust. Also, there are limits to the power, thrust, or torque that the engine(s), shaft(s), propellers, and other associated components can withstand. Likewise, the engine(s) are limited by the temperature at which the engine components or fluids may be operated. Such various constraints and are typically represented as maximum ratings provided by the engine manufacturer.

During the operation of aircraft 100, different constraints dominate the aircraft's performance limitations depending on the phase of flight, air density and temperature, and other parameters. For instance, during takeoff and climb, the performance of aircraft 100 tends to be limited primarily by the maximum engine power, thrust, or torque, whereas during cruise, the performance of aircraft 100 tends to be limited by engine temperature.

Because of the complexity and variability of the forces of both, lift 102 and drag 104, it is difficult for the pilot of aircraft 100 to maintain the optimal throttle setting, accounting for the current altitude, weight, and conditions of the air, in order to take off, climb, or cruise at the desired operating point, which may be, for example:
  the point of maximum power, thrust, or torque in takeoff or climb phases;
  the point of maximum temperature during cruise; or
  the point of maximum efficiency for maximum-endurance flight.

According to some embodiments, an autothrottle control system (which may be referred to interchangeably as an autothrottle system, or, simply, an autothrottle) is employed in an aircraft to dynamically adjust the engine power in order to maintain an operating point, or sequence of operating points, for the current phase(s) of flight. The operating point may be set and varied by the pilot using an interface of the autothrottle system that includes the PCL. Also, the operating point may be automatically adjusted by the autothrottle system to maintain a safe or optimal flight envelope.

In another related aspect, a simple set of input devices, such as switches, pushbuttons, or the like, accompany the PCL to facilitate pilot control of the autothrottle, including an input to set the autothrottle control mode.

Figure 1B:
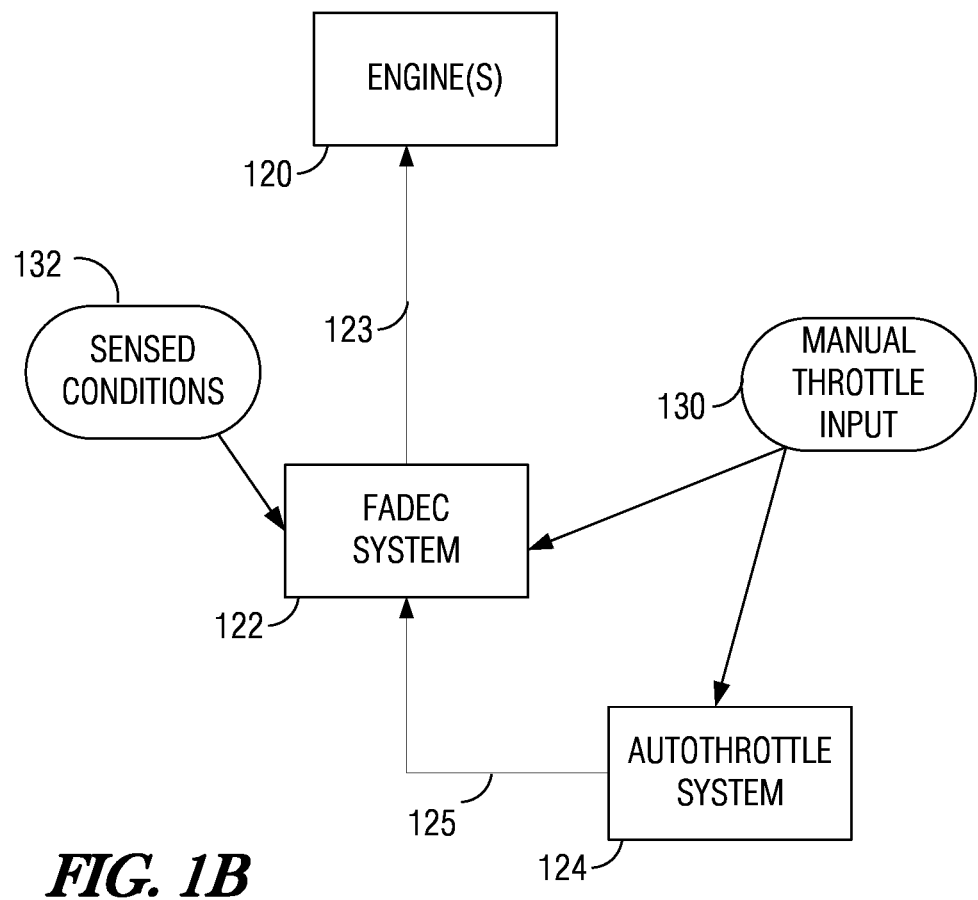
FIG. 1B is a simplified block diagram illustrating a basic relationship between a FADEC system and an autothrottle system when such systems are implemented together on an aircraft according to some embodiments.

FIG. 1B is a simplified block diagram illustrating a basic relationship between a FADEC system and an autothrottle system when such systems are implemented together on an aircraft according to some embodiments. As depicted, engine(s) 120 of an aircraft is/are controlled by FADEC system 122, which produces engine control signaling 123. Engine control signaling 123 includes various signals to control actuators such as throttle settings, stator vane position, air bleed valve position, and the like, for the engine(s) 120, based on flight condition including air density, engine temperatures, engine pressures, and other such parameters, and further on manual throttle input.

FADEC system 122 receives inputs that include manual throttle input 130, and sensed conditions 132. One example of manual throttle input 130 is a position of the PCL. Sensed conditions 132 include outputs of temperature sensors, pressure sensors, and the like, to provide flight condition information to FADEC system 122.

Autothrottle system 124 also receives manual throttle input 130. In various implementations, autothrottle system 124 reads the same PCL position sensor(s) which is/are read by FADEC system 122. In other implementations, autothrottle system 124 uses dedicated PCL sensors which are distinct from those used by FADEC system 122. Autothrottle system 124 produces autothrottle (AT) output 125, which is received by FADEC system as an input. In some embodiments, as described in greater detail below, autothrottle system 124 includes a FADEC interface that controls the PCL position input to FADEC system 122 to select from among manual throttle input 130, or AT output 125.

Figure 2A:
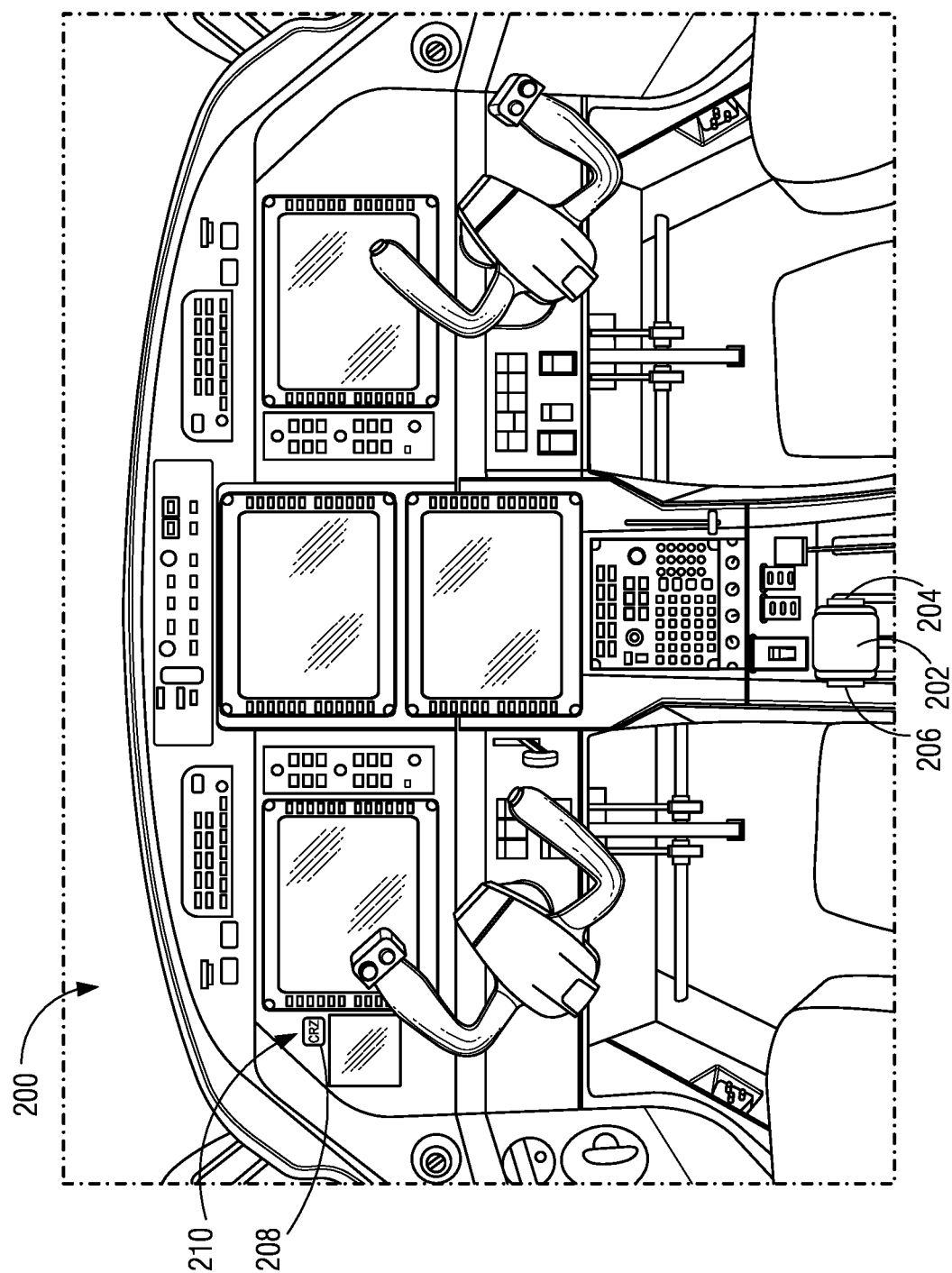
FIG. 2A is a diagram illustrating a cockpit or flight deck of an aircraft, in which autothrottle controls may be retrofitted in accordance with some embodiments of this disclosure.

FIG. 2A is a diagram illustrating a cockpit or flight deck 200 (these terms may be used interchangeably in the present context) of an aircraft, such as aircraft 100, in which autothrottle pilot-interface controls are implemented in accordance with some embodiments of this disclosure. Cockpit 200 includes PCL 202 which, in this example, is pivotably mounted in the center console, and movable in the forward and aft directions along an arcuate travel path.

PCL 202 may be a single lever, as shown in the example illustrated, or it may comprise multiple levers (not shown) in the case of a multi-engine aircraft. For simplicity, this description will refer to one or more power-control levers simply as the "PCL," unless specific reference to multiple levers is intended. In a more general embodiment, rather than a lever, a power-control input may be provided in a different form. For example, a power control input may be implemented as at least one slider, knob, wheel, pedal, or other pilot-actuatable mechanism (or set of mechanisms). Here, too, for the sake of brevity, the power-control input (in whichever form it may be) is referred to simply as a "PCL."

In a FADEC-enabled aircraft, PCL 202 is coupled, via a FADEC system controller, to the respective engine(s) and fuel-delivery system(s) of aircraft 100. For example, the FADEC system reads signaling indicating the position or movement of the PCL, and interprets that position or movement as the pilot's call for setting or adjusting the engine power. For example in some implementations, the position of the PCL (selected thrust position) information is monitored by the FADEC controller via a PCL angle measuring sensor, such as a potentiometer, a rotary variable differential transformer (RVDT) or a rotary variable inductance transducer (RVIT) sensor, among other types of sensors. In turn, the FADEC system controller activates or adjusts an actuator that regulates the engine power (e.g., flow of fuel or combustion air or, in the case of electric aircraft, the delivery of electrical power to the engine(s)) based on the position or movement of the PCL. A number of other engine parameters may likewise be controlled by the FADEC system.

The autothrottle system may also be arranged to detect and monitor the position of PCL 202, as described in U.S. Pat. No. 11,027,854, the disclosure of which is incorporated by reference herein, or by other suitable sensing means. Therefore, PCL 202 may serve as a portion of the autothrottle pilot-interface controls. In one type of embodiment, the autothrottle system uses the angle measuring sensor(s) which are part of the FADEC system are also read by the autothrottle system to determine the PCL position. In other embodiments, the autothrottle system utilizes additional dedicated sensor(s) to measure the PCL position independently from the FADEC system's sensors.

The example depicted in FIG. 2A illustrates additional autothrottle pilot-interface controls, namely, autothrottle activation control 204, takeoff/go around control 206, and autothrottle mode selector 208. These controls 204-208 are implemented as momentary pushbutton switches according to the embodiment depicted. However, in other embodiments, controls 204-208 may be implemented using other types of input mechanisms, such as selector knob(s), rocker switches, multi-position selector switch(es), toggle switch(es), push-on/push-off switch(es), soft-key controls (e.g., via touchscreen), or the like.

In addition, autothrottle mode display 210 is provided. Autothrottle mode display 210 may include LED or LCD segments, a matrix of LED or LCD devices, or other suitable display technology, along with display-decoder or driver circuitry, which interfaces the display device with an autothrottle controller (described below). In the example depicted, autothrottle mode display 210 is integral with autothrottle mode selector 208 such that information is displayed on the pilot-facing surface of autothrottle mode selector 208. In other embodiments, autothrottle mode display 210 is separate from autothrottle mode selector 208, and may be placed elsewhere in the control panel of cockpit 200. In still other embodiments, autothrottle mode display 210 is implemented using a general-purpose information display present in cockpit 200, such as an instrument display or navigation display screen, or as part of the information displayed on a heads-up display.

Figure 2B:
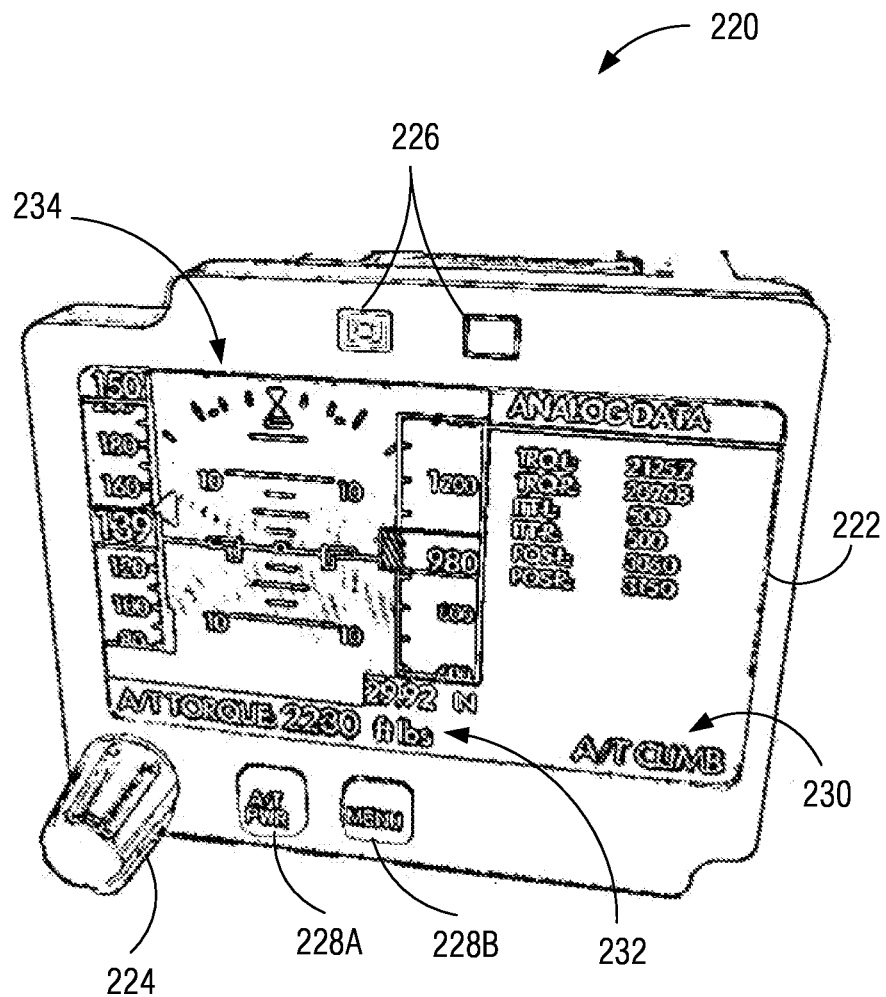
FIG. 2B is a diagram illustrating an implementation of autothrottle controls and information display as part of an integrated standby unit (ISU) according to an embodiment.

FIG. 2B is a diagram illustrating an implementation of autothrottle controls and information display as part of an integrated standby unit (ISU) according to an embodiment. As shown, ISU 220 is a user interface that includes multifunction display 222, and various autothrottle controls, including selector knob 224, indicator lights 226, and pushbuttons 228A and 228B. Multifunction display 222 can display information pertinent to autothrottle operation, such as AT mode indication 230, and AT settings 232. Indicator lights 226 may indicate the autothrottle state, such as armed/disarmed, and engaged/disengaged. For example, indicator lights 226 may illuminate in green when the autothrottle is engaged, amber when the autothrottle is disengaged, and may be non-illuminated when autothrottle is not engaged.

Pushbutton 228A, marked A/T PWR, may function as an arm/disarm control for the autothrottle system. Pushbutton 228B, marked MENU, may function as a control of the function of selector knob 224. Accordingly, depending on the operational context, selector knob 224 may operate as an input for selecting the autothrottle mode, the autothrottle control-target setting, etc. Selector knob 224 may provide a pushbutton input in addition to rotational input. In a related embodiment, at least a portion of the circuitry of the autothrottle system, such as the controller, may be housed in ISU 220.

In addition to autothrottle information, multifunction display 222 can show various flight and engine-related conditions, such as airspeed, altitude, heading, horizon, and various monitored engine conditions, all of which may be redundant to other, primary, instruments provided in the instrument cluster of the aircraft's flight deck, consistent with information displayed in a conventional standby unit. Notably, in some embodiments, ISU 220 has a form factor that matches a conventional standby unit original to the aircraft, which is to be replaced by ISU 220. For example, ISU 220 may fit the cutout in the instrument panel which was originally made for the conventional standby unit. Advantageously, addition of ISU 220 does not change the certified field of view for the aircraft, which may be of particular benefit in retrofit applications.

Figure 3:
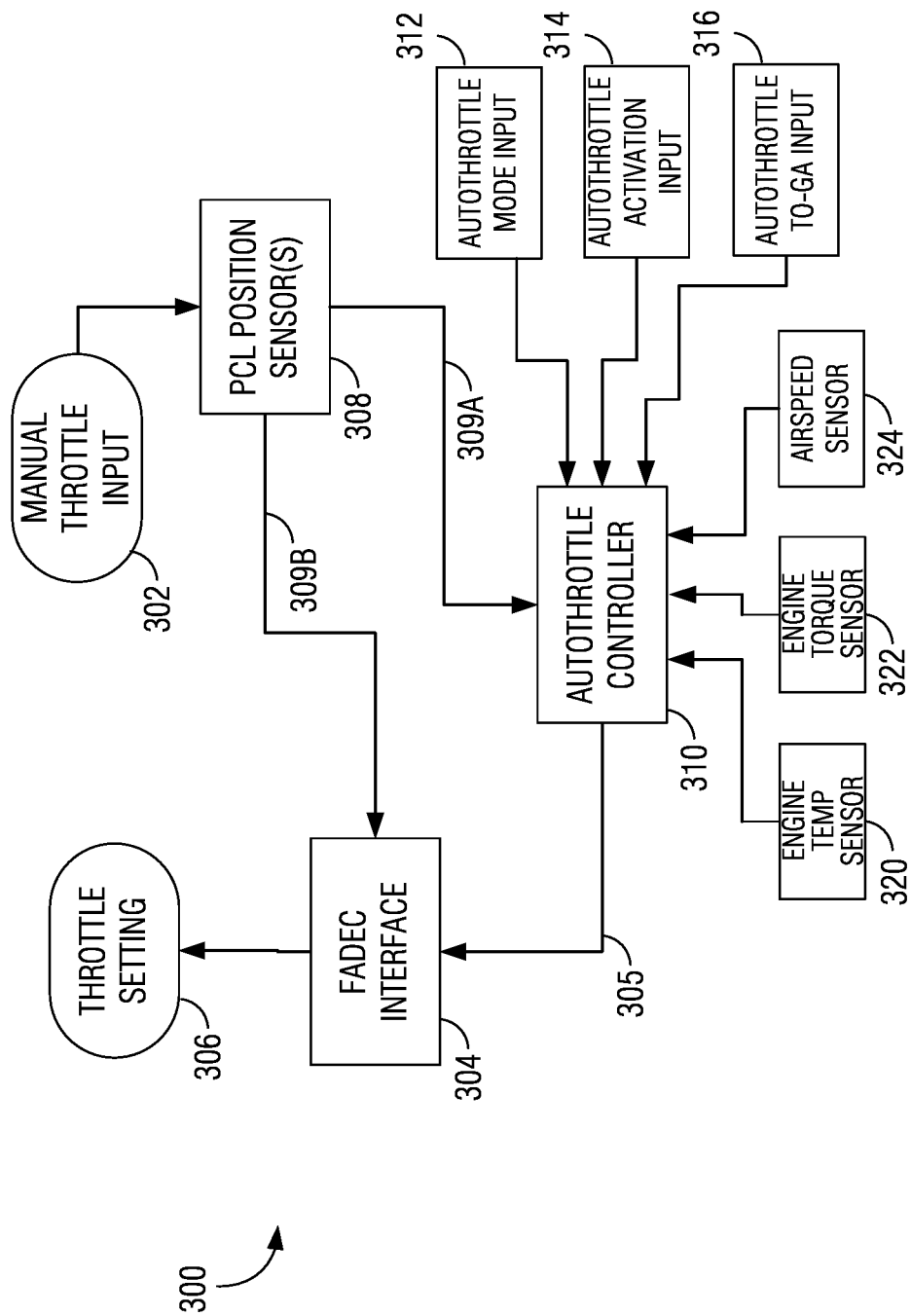
FIG. 3 is a high-level block diagram illustrating an autothrottle control system according to some embodiments.

FIG. 3 is a block diagram illustrating an autothrottle control system 300 according to some embodiments. As depicted, system 300 includes manual throttle input 302, which may take the form of a PCL, such as PCL 202, or other type of input. For example, a pilot interface may be provided in the form of a local operator interface (LOI) device. A LOI device may have or implement one or more pushbuttons, knobs, switches, touchscreen controls, joystick, trackball, touchpad, microphone and voice-recognition system, or the like, to accept input from the pilot, such as enable/disable, engage/disengage, control mode select, speed/torque settings, etc. The LOI device may include a display or indicator light(s) that shows the operational state of the autothrottle system, as well as the setpoints for autothrottle control.

Throttle setting sensor(s) 308 are arranged to detect the position or motion of the PCL(s), and provide PCL position signaling 309A to autothrottle controller 310, and to FADEC interface 304. Notably, signaling 309A and 309B represents the effect of manual movement of the PCL when manual PCL input 302 is applied.

FADEC interface 304, examples of which are described in greater detail below, facilitates the cooperative operation of the autothrottle system with a FADEC system. When the autothrottle system is engaged, autothrottle controller 310 generates command signaling 305, which is selectively fed to the FADEC system via FADEC interface 304. The FADEC system automatically generates throttle settings 306 to regulate the engine power, and controls other parameters to optimize engine performance and reliability. When the autothrottle system is disengaged, FADEC interface 304 does not pass command signaling 305 to the FADEC system.

In one type of implementation, as discussed in greater detail below, FADEC interface 304 selects between command signaling 305 from autothrottle controller 310, and sensed PCL position signaling 309B, depending on whether the autothrottle system is engaged or disengaged. Further, as discussed in greater detail below, in some embodiments, command signaling 305 is a virtual PCL position signal which is synthesized to mimic actual PCL position signaling 309B as if the PCL were manually positioned or moved. The virtual PCL position signal virtualizes the electrical characteristics of the actual sensed PCL position signaling such that the automated power command signaling produced by the autothrottle system is recognized by the FADEC system as sensed PCL position signaling.

In some embodiments, autothrottle controller 310 monitors the PCL position via PCL position sensor(s) 308 by receiving PCL position signaling 309A. When autothrottle controller 310, in its engaged state, is generating command signaling 305, the PCL position is simultaneously monitored for any manual throttle input 302. In this operating state, in the absence of manual throttle input 302, autothrottle controller 310 maintains its automatic control mode; however, when manual throttle input 302 is detected, autothrottle controller 310 disengages, and provides notification of its disengagement to the pilot. Such notification may include visual indication using lights or display, and audible notification. In some implementations, the notification is repeated until the pilot acknowledges the disengagement of the autothrottle control.

Autothrottle controller 310 produces command signaling 305 to FADEC interface 304 based on a plurality of inputs. Autothrottle mode input 312 is provided by the pilot of aircraft 100 via suitable input, such as autothrottle mode selector 208, or controls 224 and 228 of ISU 220. The input may include such parameters as engagement/disengagement of autothrottle controller 310, selection of autothrottle mode, or selection from one or more available autothrottle programs that define the behavior or operational objective of the autothrottle.

Other inputs to autothrottle controller 310 may include autothrottle activation input 314, and autothrottle TO-GA command input 316. Autothrottle activation input 314 may be provided via autothrottle activation control 204, and is operable by the pilot in various patterns (e.g., short press/long press) to select between engaged and armed states of the autothrottle control, as well as to completely disengage the autothrottle to a disarmed state. Autothrottle takeoff/go around (TO-GA) input is provided via takeoff/go around control 206, and is operable by the pilot to place the autothrottle in a takeoff autothrottle program when aircraft 100 is on the ground, or to place the autothrottle in a climb (go-around) program when aircraft 100 is in the air. Additional functions may be assigned to inputs 312-316, which may be actuated individually, or in combination with manual throttle input 302 via PCL 202. For instance, autothrottle activation input 314 may be further activated in a certain pattern (e.g., double-press) by the pilot to toggle between coarse or fine speed adjustment of the autothrottle. Likewise, actuation of autothrottle activation input 314 in conjunction with positioning of PCL 202 may be used by the pilot to set or re-set an autothrottle control-target setting.

Autothrottle controller 310 may also receive various inputs from sensors, such as engine temperature sensor 320, engine torque sensor 322, and airspeed sensor 324, along with other available sensors on aircraft 100, such as altimeter, fuel-consumption-rate sensor, etc.

Figure 4:
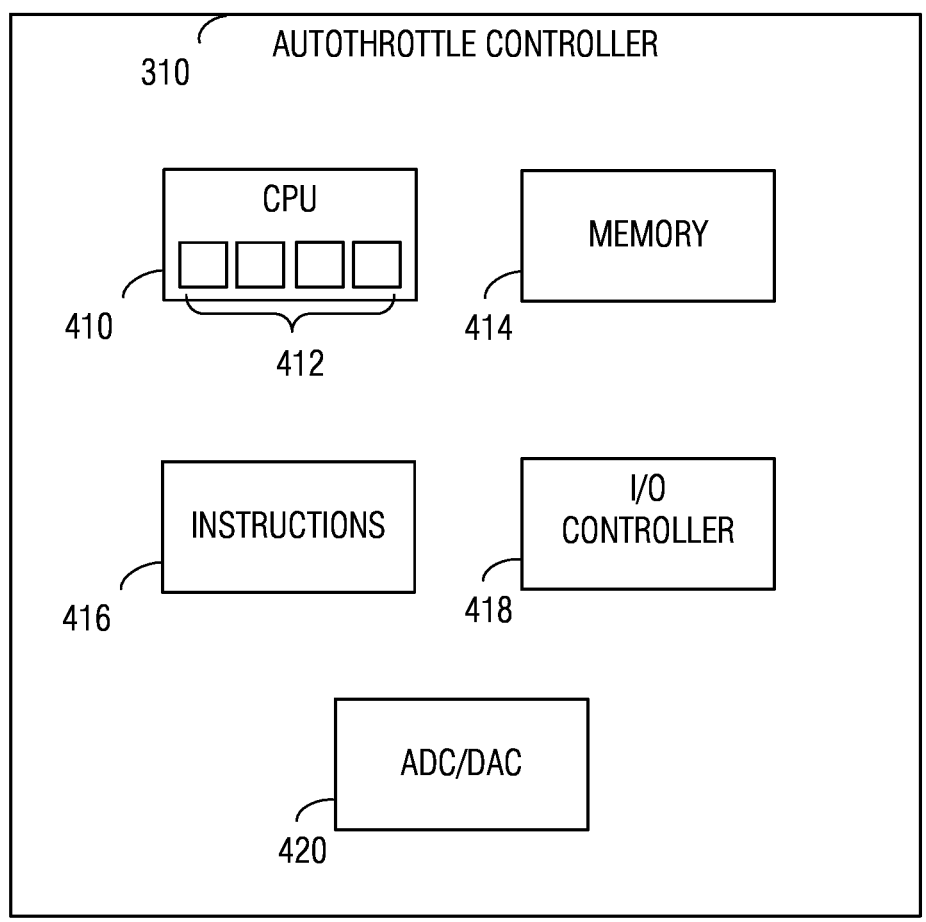
FIG. 4 is a simplified block diagram illustrating components of an autothrottle controller according to an example implementation.

FIG. 4 is a simplified block diagram illustrating components of autothrottle controller 310 according to an example implementation. Autothrottle controller 310 includes central processing unit (CPU) 410, which may include one or more processor cores 412. Memory circuitry 414 may include static or dynamic random-access memory (RAM) and a memory controller circuit interfaced with CPU 410. Instructions 416 may be stored on a read-only memory (ROM) device, or an electrically-erasable programmable read-only memory (EEPROM) device such as a flash EEPROM device interfaced with CPU 410 or the memory controller circuit of memory 414. Input/output (I/O) controller 418 includes interfaces to the various inputs and command signaling 305 output described above. In some implementations, I/O controller 418 may include a universal asynchronous receiver/transmitter (UART) for serial communications, a parallel port, or a data bus interface. I/O controller 418 may be interfaced with CPU 410 or memory controller of memory 414.

ADC/DAC 420 includes an analog-to-digital (A/D) converter, and a digital-to-analog converter (D/A), which may be interfaced with one or more sensors or actuators. In some embodiments, ADC/DAC is interfaced with PCL position sensor(s) 308 (and receives PCL position signaling 309A). ADC/DAC 420 may also be interfaced with FADEC interface 304, in which case ADC/DAC 420 may synthesize command signaling 305. ADC/DAC 420 may be interfaced with CPU 410 or memory controller of memory 414.

Figure 5:
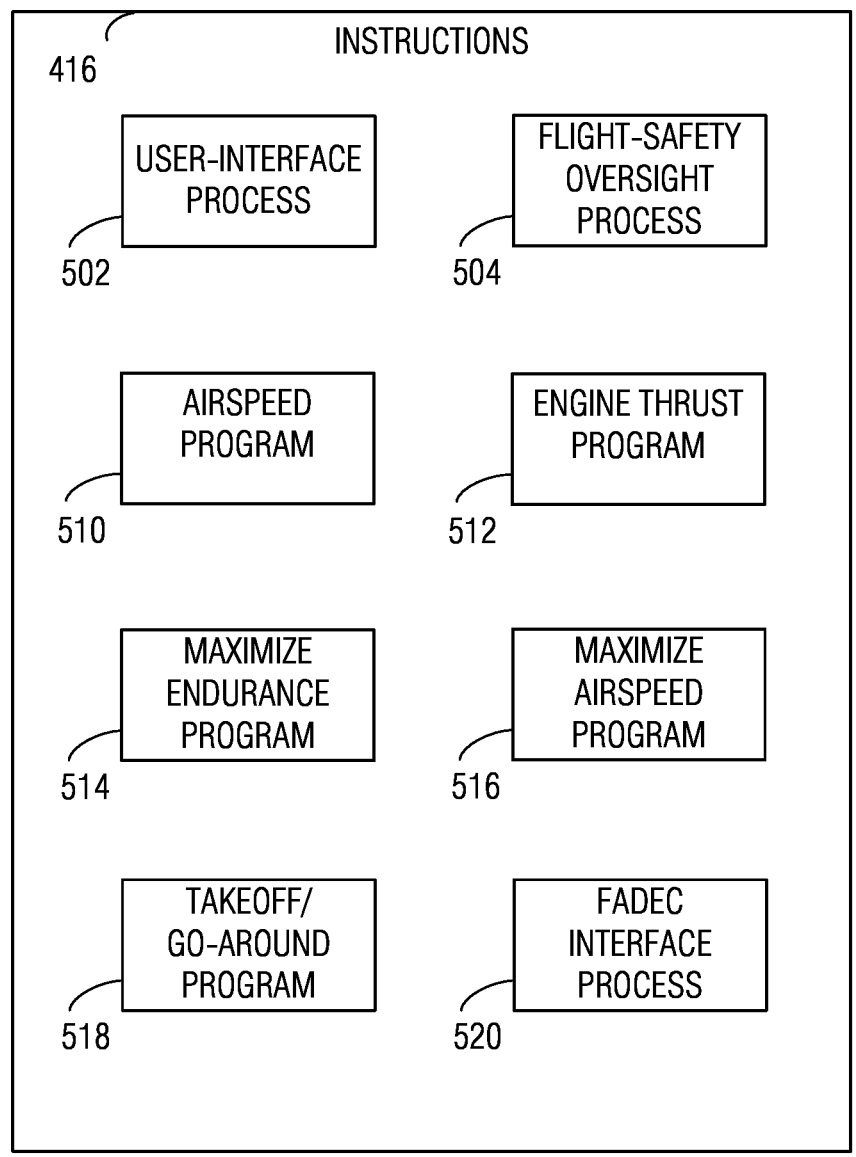
FIG. 5 is a simplified block diagram illustrating portions of certain instructions executable by the autothrottle controller according to some examples.

Autothrottle controller 310 is operative to execute instructions 416 in order to carry out the functionality of autothrottle control system 300. FIG. 5 is a simplified block diagram illustrating portions of instructions 416 according to some examples. In operating autothrottle control system 300 via autothrottle mode input 312 or autothrottle TO-GA input 316 the pilot of aircraft 100 may select from among certain available programs which dictate the control algorithm of the autothrottle operation. Also, the operating state of the autothrottle is selectable via autothrottle mode input 312 and autothrottle activation input 314.

Instructions 416 include user-interface process 502, flight-safety oversight process 504, airspeed program 510, engine-thrust program 512, maximize endurance program 514, maximize airspeed program 516, takeoff/go-around program 518, and FADEC interface process 520. Each process or program comprises a set of instructions executable by autothrottle controller 310 for operating autothrottle control system 300. In general, each of programs 510-518 is executed individually (although one program may automatically transition to another program). However, user-interface process 502, flight-safety oversight process 504, and FADEC interface process 520 are continuously executed.

Figure 6:
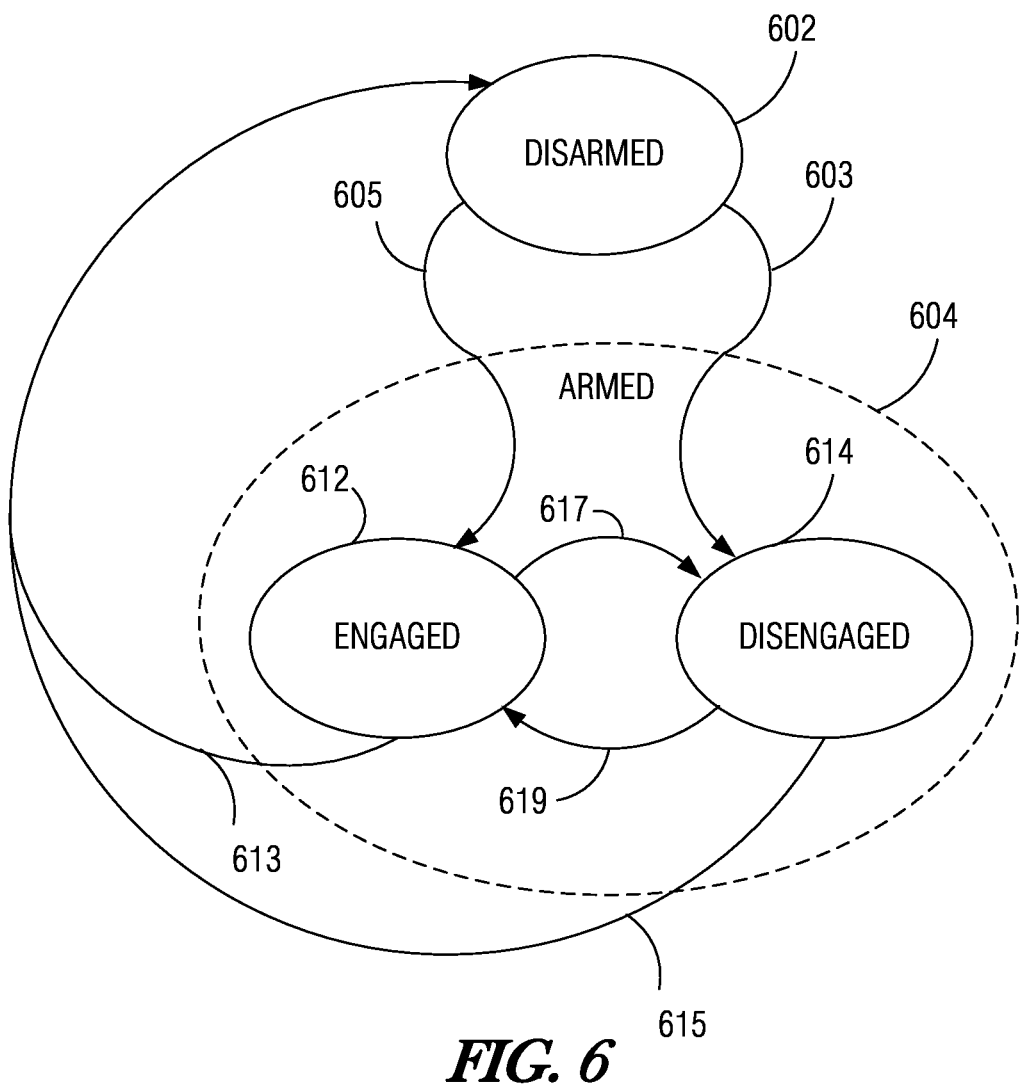
FIG. 6 is a state diagram illustrating some basic states of an autothrottle control system according to some embodiments.

User-interface process 502 is operative to monitor all user inputs (and, optionally, certain sensors) and set the autothrottle control system 300 into various states in response thereto. FIG. 6 is a state diagram illustrating some basic states, according to an example implementation. The basic states include disarmed state 602, and armed state 604. Armed state 604 comprises engaged state 612, and disengaged state 614. Autothrottle control system 300 transitions from disarmed state 602 into armed-disengaged state 614 via transition 603, and transitions from armed-disengaged state 614 back to disarmed state 602 via transition 615. Autothrottle control system 300 transitions from disarmed state 602 into armed-engaged state 612 via transition 605, and transitions from armed-engaged state 612 back to disarmed state 602 via transition 613. In the armed state, autothrottle control system 300 transitions between engaged state 612 and disengaged state 614 via transitions 617 and 619, as shown.

In disarmed state 602, the autothrottle control system 300 is generally inoperative. It may be completely inoperative in some embodiments or, in other embodiments, the autothrottle control system 300 may be minimally operative to monitor certain safety-related indicia, such as overspeed/underspeed, overtemp, overtorque, and may autonomously engage autopilot control in response to an unsafe condition in order to restore and maintain a safe flight envelope. In the armed states 604, the autothrottle control system 300 monitors the control inputs and determines the autothrottle control-target settings. In armed-engaged state 612, the autothrottle control system 300 generates command signaling 305 in accordance with the control-target settings.

Table 1 below summarizes various operations of pilot inputs that are handled by user-interface process 502, according to an example implementation.

TABLE 1

| CONTROL INPUT | FUNCTIONALITY |
| --- | --- |
| AUTOTHROTTLE MODE SELECTOR 208 | Press and hold (>1 sec) to engage or disengage the autothrottle. Short press to toggle between THR - SPD mode (when engaged); or THR armed - SPD armed - OFF (when not engaged). |
| AUTOTHROTTLE ACTIVATION CONTROL 204 | Press and hold (>1 sec) to disengage the autothrottle completely. Short press to disconnect into the armed state, or re-engage from armed state. Double-press to toggle fine/coarse speed adjustment while armed. |
| TAKEOFF/GO AROUND CONTROL 206 | Press to activate Takeoff mode (on ground), or Go-Around mode (in air). |
| PCL 202 | Move to adjust the autothrottle control target (e.g., speed or torque) when the autothrottle is in the armed state. |
| SELECTOR KNOB 224 | Turn to adjust setpoint or scroll through list of selectable options or submenus. Press to complete selection or enter submenu. Press and hold (>1 sec) while autothrottle is engaged to change modes. |
| A/T PWR BUTTON 228A | Press to toggle between Armed and Disarmed states. Press and hold (>1 sec) to toggle between Engaged and Disengaged states. |
| MENU BUTTON 228B | Press to enter into, or exit from, submenu selection. |

In one embodiment, as shown in FIG. 2A, autothrottle mode selector 208 is a button that is used to initially arm the autothrottle system and toggle between autothrottle modes. In another embodiment, as shown in FIG. 2B, the A/T PWR button 228A has similar functionality. The modes are described in greater detail below and may include (without limitation):

| TO | Takeoff mode |
| CLB | Climb mode |
| CRZ | Cruise - max power mode |
| THR | Thrust-hold mode |
| GA | Go-around mode |
| ### | Set-speed control mode |
| OFF | Disengaged |

In the embodiment shown in FIG. 2A, the mode selector 208 button, mounted on the instrument panel, may incorporate display 210 (e.g., a backlit-LCD or LED array on the button face) to display autothrottle mode and speed target values. Autothrottle modes may be displayed in a first color, e.g., white, when in the armed-disengaged state 614, and in a second color, e.g., green, when in the armed-engaged state 612.

In the embodiment of FIG. 2B, the A/T PWR button 228A has similar functionality to the mode selector 208 button. Multifunction display 222 and indicator lights 226 are operative to indicate the state of the autothrottle system.

Pressing the autothrottle mode selector 208 button or the A/T button 228A while not in any armed state 604 arms the autothrottle. In one example, the autothrottle initially arms at the current torque or airspeed. In some examples, repeated presses of the autothrottle mode selector 208 button or the A/T PWR button 228A toggles between Thrust and Speed modes (Thrust armed, Speed armed, and Off if not engaged). In some examples, pressing and holding the autothrottle mode selector 208 button or the A/T PWR button 228A (for >1 sec) engages or disengages the autothrottle. The autothrottle can only be engaged from an armed state 604.

In other examples, selector knob 224 may be used to facilitate autothrottle mode selection input rather than, or in addition to, the A/T PWR button 228A. A wide variety of input patterns, and other types of user-interface controls are contemplated for facilitating user interaction with the autothrottle system.

In some embodiments, when the autothrottle system 300 is in an armed state 604, PCL 202 can be moved to adjust the autothrottle target torque or speed value. The adjusted setpoint is shown on display 210. Notably, the autothrottle setpoint can be adjusted and set using manual movement of PCL 202 before the aircraft actually attains the set parameter in flight.

In some embodiments, Autothrottle activation control 204, in one embodiment, is a button located on the right side of the PCL handle. Pressing the autothrottle activation control 204 button will place the autothrottle system 300 into armed-engaged state 612, or disconnect the autothrottle into the armed-disengaged state 614. Pressing the autothrottle activation control 204 button again will re-engage the (armed) autothrottle into state 612 to actively maintain the updated torque or speed target. Double-pressing the autothrottle activation control 204 button while in the armed-disengaged state 614 in the speed-control mode will toggle coarse or fine adjustment of the target speed. Pressing and holding the autothrottle activation control 204 button (>1 sec) will disengage the autothrottle completely returning to disarmed state 602.

In one embodiment, takeoff/go around control 206 is implemented as a button on the left side of the PCL handle. If the autothrottle system is in the armed-disengaged state 604 and the mode is set to Takeoff (TO) mode, activating the takeoff/go around control 206 button on the throttle handle will activate TO mode and command signaling 305 will automatically be adjusted to the maximum continuous thrust setting. When aircraft 100 is in the air, pressing the takeoff/go around control 206 button while the autothrottle is in either armed state 612, 614 will activate Go-Around (GO) mode and the command signaling 305 will automatically adjust to maximum continuous thrust under the control of the autothrottle.

Turning again to FIG. 5, flight-safety oversight process 504 is operative to monitor the aircraft's sensors (e.g., engine temperature sensor 320, engine torque sensor 322, airspeed sensor 324, altimeter, etc.) and compare the present state of operation or performance, or the condition, of aircraft 100 to the predefined constraints of aircraft 100 and its engine(s), to ensure that the aircraft is being operated within its safe flight envelope. For instance, overspeed/underspeed at the present altitude, temperature limit, torque limit, differential torque in multi-engine aircraft, and the like, may be monitored, and the autothrottle system's controls may be overridden to adjust the command signaling 305 so that the aircraft remains within safe operating conditions.

Airspeed program 510 causes the autothrottle to implement a basic fixed-airspeed control (set-speed control mode). Program 510 accepts pilot input to set a particular airspeed, which may be set via manual throttle input 302 via movement of PCL 202 or selector knob 224, for instance. Thereafter, airspeed program 510 generates command signaling 305 to increase engine power if the indicated airspeed drops below the set point, and to decrease engine power if the indicated airspeed rises above the set point. When the autothrottle is engaged in a set-speed control mode, the pilot may press the autothrottle activation control 204 button or A/T PWR button 228A, for instance, to release the autothrottle into armed-disengaged state 614 and move the PCL 202 or selector knob 224 to select a new target speed (which may be displayed in white on display 210). After the target speed is selected, pressing the autothrottle activation control 204 button or A/T PWR button 228A again re-activates the autothrottle to maintain the selected airspeed. In the armed-disengaged state 614, while in set-speed control mode, movements of PCL 202 or A/T PWR button 228A may be translated to target speed changes rounded to 5-knot increments. Double-clicking the autothrottle activation control 204 button, or selector knob 224, for instance allows the target speed to be adjusted in (fine) 1-knot increments.

Engine-thrust program 512 executes the thrust hold mode (THR) to maintain the current engine torque. Program 512 may automatically reduce the torque to enforce the applicable power and temperature limits based on the current rate-of-climb. While the autothrottle is in the armed-engaged state 612 in THR mode, the pilot may press the autothrottle activation control 204 button to temporarily release the autothrottle into the armed-disengaged state 614, and manually move PCL 202 or A/T PWR button 228A to select a new thrust setting. After adjusting torque, the autothrottle can be re-engaged by pressing the autothrottle activation control 204 button or A/T PWR button 228A again to maintain the new torque.

Maximize endurance program 512 implements a dynamic airspeed control algorithm for determining and maintaining an efficient operating point for aircraft 100 such that the aircraft operates at or near its maximum lift-to-drag (L/D) ratio under the prevailing conditions, such as described in U.S. patent application Ser. No. 17/359,019, the disclosure of which is incorporated by reference herein.

Maximize airspeed program 516 implements a dynamic control algorithm of autothrottle system 300 for cruise operation that monitors the engine temperature (e.g., via engine temperature sensor 320) and adjusts the command signaling 305 to call for the maximum speed while maintaining the engine temperature at or near the applicable max-operating-temperature limit.

Takeoff/go-around program 518 implements takeoff mode (TO), climb mode (CLB), cruise mode (CRZ), and go-around mode (GA), as well as the automatic transitions between these modes. TO is initiated while aircraft 100 is on the ground. According to takeoff program 518, command signaling 305 is set to maintain maximum continuous torque (MCT). TO is armed by pressing the mode selector 208 button or A/T PWR button 228A (while on the ground). Pressing the mode selector 208 button or A/T PWR button 228A again will disarm TO.

With TO armed, the pilot may initiate the autothrottle takeoff by pressing the takeoff/go around control 206 button on the PCL handle, as described above. This causes the autothrottle 300 to engage and adjust command signaling 305 dynamically to gradually increase power to MCT. Under such control, the thrust will be maintained at MCT until it is manually or automatically reduced to climb power.

In accordance with takeoff/go-around program 518, TO transitions to climb mode (CLB) upon meeting the predefined mode-transition criteria. In one implementation, the mode-transition criteria includes a predefined time duration at MCT (e.g., 2-5 minutes). In another implementation, the mode-transition criteria for entering CLB is an altitude gain, which is measurable by an available barometric altimeter in aircraft 100 (e.g., an altitude increase of 400 feet from the altitude at which the TO was initiated). This approach uses readily-available altimetry data, rather than relying on a radar-based altimeter or other expensive instrumentation, which is not commonly found on many small aircraft.

In a related embodiment, the transition criteria for entering CLB includes manual reduction of PCL 202 by the pilot during TO (e.g., by actuating the autothrottle activation control 204 button to transition the autothrottle state to armed-disengaged state 614, reducing power by manually repositioning PCL 202, and then re-engaging the autothrottle to engaged state 612 by once again actuating activation control 204 button). In other embodiments, CLB mode can be initiated by operation of other control(s), such as pressing and holding selector knob 224 for more than one second when the autothrottle is already engaged.

In climb mode (CLB), the autothrottle maintains MCT, but will reduce power automatically to enforce engine temperature limits. If the takeoff or climb is paused by levelling off (automatically detectable as a low rate of climb such as less than 200 feet per minute by monitoring the available altimeter), the autothrottle will transition to cruise mode (CRZ) and reduce power to the maximum cruise power setpoint.

In cruise mode (CRZ), the autothrottle controls the PCL to produce maximum cruise torque while enforcing engine temperature limits.

Go-around mode (GA) is similar to TO, except that GA is activated while the autothrottle is either in the armed-engaged state 612, or armed-disengaged state 614, and when aircraft 100 is in the air. Under such conditions, GA is activated upon actuation of the takeoff/go around control 206 button by the pilot. Once activated, GA functions essentially in the same manner as TO, i.e., the autothrottle sets the PCL for MCT, and maintains this setting until a condition is met to transition to climb mode (CLB) or cruise mode (CRZ).

FADEC interface process 520 is operative to determine the signaling and range of values for command signaling 305. Notably, when the autothrottle is in engaged state 612, command signaling 305 replaces sensed PCL position signaling 309B as an input to FADEC interface 304 (FIG. 3). Accordingly, in some embodiments, autothrottle controller 310, under control of FADEC interface process 520, learns the electrical characteristics of the PCL position signaling 309B by sampling and quantizing that signaling using the analog-to-digital converter of ADC/DAC 420 (FIG. 4) during the initial configuration process. As an example of the initial configuration, PCL 202 may be moved from one positional limit to the other while autothrottle controller 310 reads the sampled and quantized PCL position signaling 309B, and stores the signaling. Once autothrottle controller 310 completes learning the PCL position signaling 309B, it is able, under control of FADEC interface process 520, to synthesize virtual PCL position signaling to be used as command signaling 305.

Figure 7:
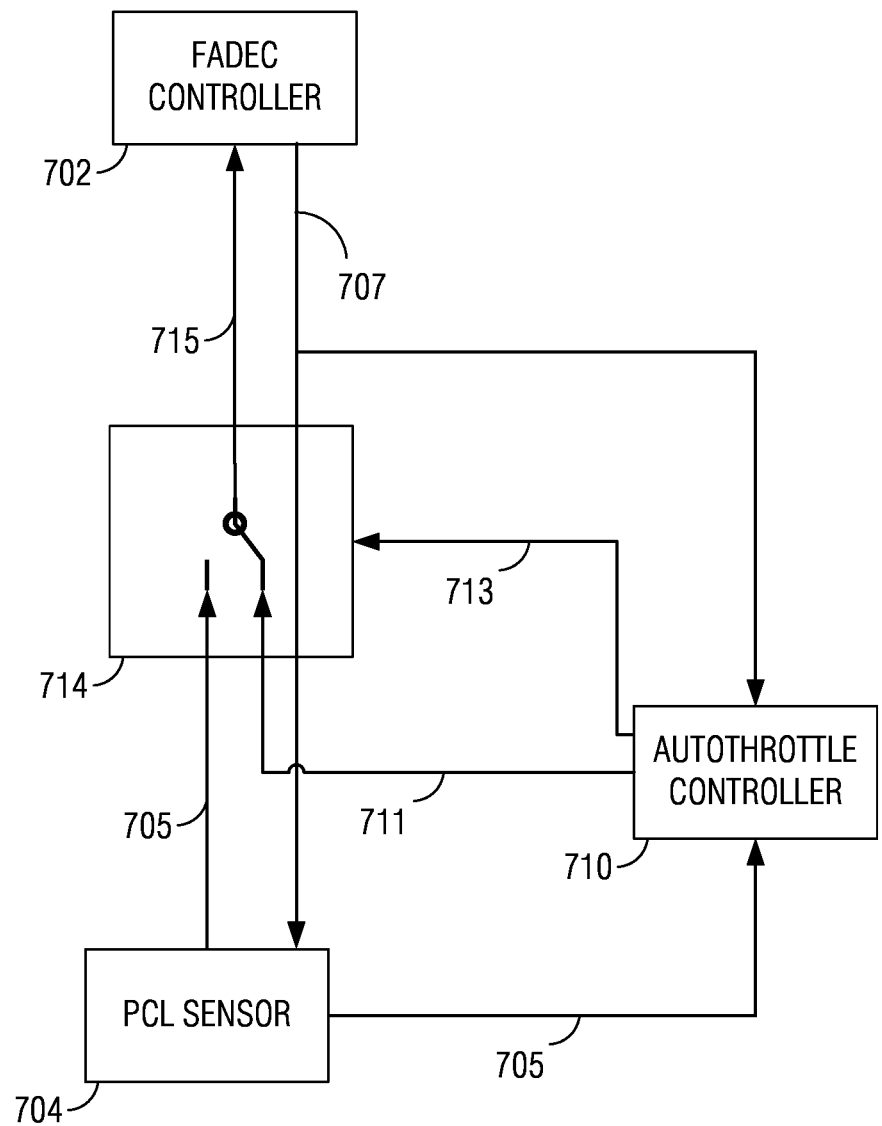
FIG. 7 is a simplified block diagram illustrating an example of an electrical interface between an autothrottle system controller and a FADEC system according to some embodiments.

FIG. 7 is a simplified block diagram illustrating an example of an electrical interface between an autothrottle system controller and a FADEC system according to some embodiments. As depicted, FADEC controller 702, which may be preinstalled in an aircraft 100, conventionally receives PCL position signaling 705 from PCL sensor 704. PCL sensor 704 may be implemented as one or more angular position sensors, such as potentiometer(s), RVDT sensor(s), RVIT sensor(s), or the like. In single-engine aircraft, there may be only one single PCL, in which case a single PCL position sensor may be used. In multi-engine aircraft with multiple PCLs, a PCL sensor may be used for each PCL. In other implementations, multiple PCL position sensors may be used per PCL for redundancy. For the sake of clarity, this discussion shows one instance of PCL sensor 704, though it will be understood that the principles described herein will readily apply to multi-PCL/multi-PCL-sensor configurations.

FADEC controller 702 may generate excitation signal 707 to be supplied to PCL sensor 704. In turn PCL sensor produces PCL position signaling 705 based on a combination of excitation signal 707 and the angular position of the PCL, such as PCL 202 (FIG. 2A). In the absence of the autothrottle system, PCL position signaling 705 is, effectively, throttle command input 715 to FADEC controller 702, which is read by FADEC controller 702 to determine the pilot's intended throttle setting.

In some embodiments, no actuator of the PCL is provided as part of the autothrottle system. Accordingly, when the autothrottle system is engaged, instead of physically moving the PCL, the thrust commands are virtualized, or emulated. Therefore, a one-to-one correspondence of the PCL position to the autothrottle-commanded thrust does not always exist. The PCL remains in the last manually set position when the autothrottle is engaged. However, when the autothrottle is engaged, the pilot can monitor the autothrottle generated throttle lever settings and autothrottle mode on the ISU display for real-time feedback. The pilot can disconnect the autothrottle and provide manual throttle level commands at any time. In some embodiments, any manual movement of the PCL while the autothrottle system is engaged immediately transitions the autothrottle state from engaged state 612 to disengaged state 614 (FIG. 6).

Autothrottle controller is selectively coupled or decoupled from the throttle command input to FADEC controller 702 based on the state of the autothrottle system. This coupling or decoupling is achieved by FADEC interface 714, which is an example of FADEC interface 304 (FIG. 3). For instance, when the autothrottle system is in engaged state 612 (FIG. 6), FADEC interface 714 selects virtual PCL position signaling 711 instead of PCL position signaling 705, to be throttle command input 715. In any other state, FADEC interface reverts to selecting PCL position signaling 705 as throttle command input 715.

Notably, excitation signal 707 does not need to be decoupled from PCL sensor 704. In other words, in various embodiments, excitation signal 707 is constantly supplied to PCL sensor 704 regardless of the operation of the autothrottle system.

In various embodiments, FADEC interface 714 may be a implemented as an electromechanical relay, or solid-state switch, such as a transmission gate with suitable supporting circuitry.

Selection of virtual PCL position signaling 711 or PCL position signaling 705 is effected in response to AT engagement signal 713 generated by autothrottle controller 713. In a related embodiment, the autothrottle system is designed to be fail-safe such that in the event of failure or malfunction of the autothrottle system, AT engagement signal 713 is not asserted. Likewise, FADEC interface 714 is constructed such that the default selection (in the absence of AT engagement signal 713) is PCL position signaling 705.

To generate virtual PCL position signaling, autothrottle controller 710 uses the learned PCL position signaling 705, which is learned at initial system configuration, and operates a digital-to-analog converter (DAC) to synthesize a signal representing the determined throttle setting, to be fed to FADEC interface 714. In some implementations, such as those which use RVDT sensor(s), the PCL position signaling 705 is linear over the range of the PCL. Accordingly, virtual PCL position signaling 711 may be linearly interpolated. In other implementations, suitable transfer functions or calibration curves may be utilized. In some implementations, excitation signal 707 is not needed by autothrottle controller 310 to generate virtual PCL signaling; whereas in other implementations autothrottle controller 310 samples, quantizes, and reads excitation signal 707, and generates the appropriate virtual PCL position signaling 711 based on the read excitation signal 707 and on PCL position signaling 705.

In related embodiments, the autothrottle system utilizes its own dedicated PCL position sensor(s) which work independently of the PCL sensor(s) that are conventionally supplied as part of the FADEC system.

Figure 8:
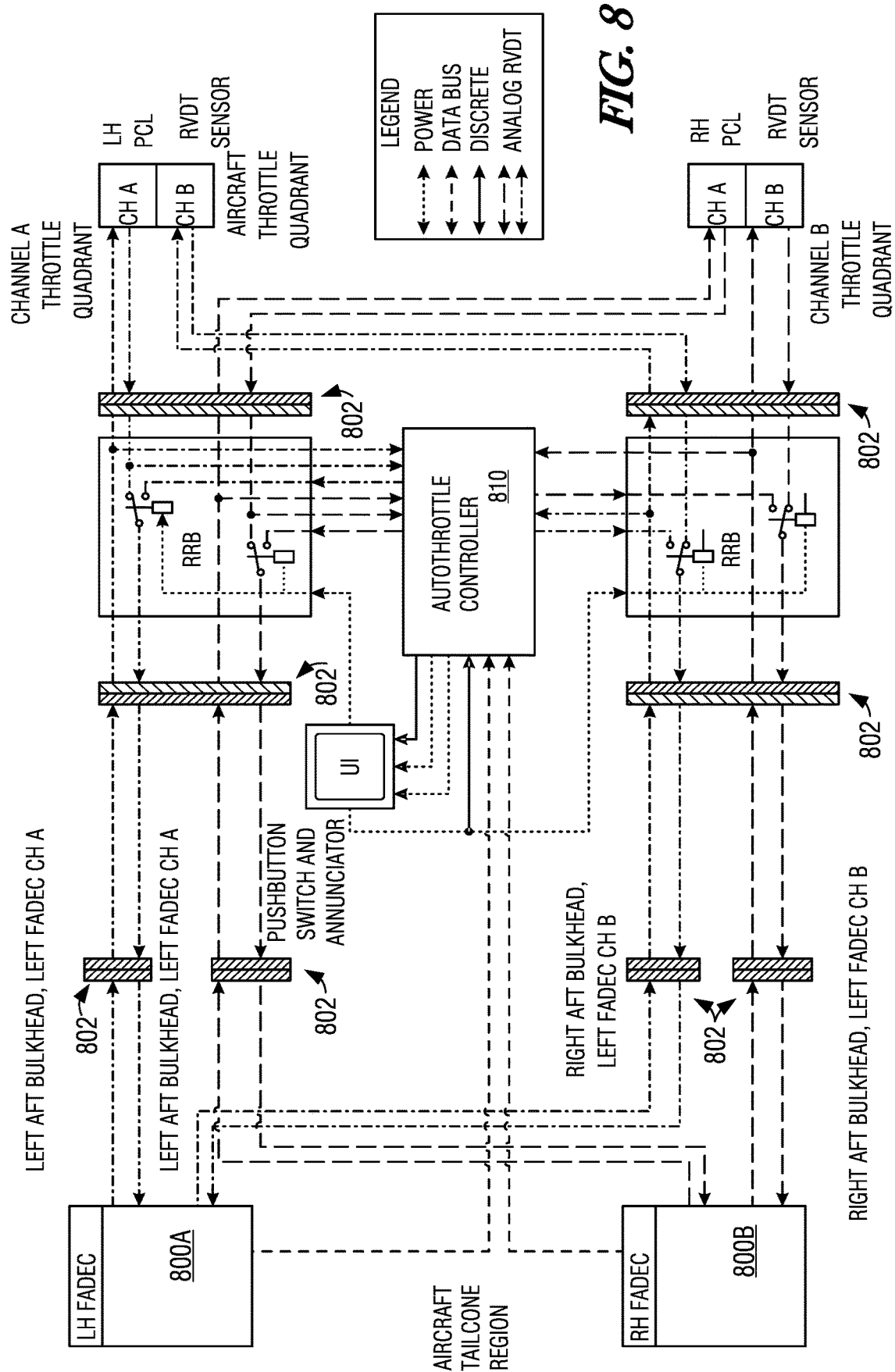
FIG. 8 is a block diagram illustrating a retrofit autothrottle system interfaced with a FADEC system of an aircraft according to an example implementation.

FIG. 8 is a block diagram illustrating a retrofit autothrottle system interfaced with a FADEC system of a twin-engine aircraft according to an example implementation. As depicted, the routing and connections of the RVDT sensor signals between the left-hand (LH) & right-hand (RH) PCLs in the throttle quadrant in the aircraft cockpit and the LH & RH FADEC controllers 800A, 800B in the tail-cone area of the aircraft pass through connectors 802 as shown. The RVDT sensor sends the angular position of the Throttle Lever that is manually controlled by the pilot of the aircraft to the FADEC. The FADEC provides control of the engine fuel based on this Throttle Lever position information. The existing redundancy provided for control of each engine using Channel A and Channel B of the LH & RH RVDT sensors and Channel A and Channel B of the LH & RH FADECs is shown.

The existing engine control redundancy is maintained by using pass-through connections and the normally closed contacts of relays in the Relay Boxes (RRB) which are part of the retrofit autothrottle system. The RVDT Excitation voltages from the FADECs to the RVDT sensors are passed through (not switched by) the RRBs and are also monitored by the autothrottle controller. Only the RVDT signals are switched by the RRBs. The relays of the RVDT Relay Boxes are switched to their normally-open contacts by switched power outputs (e.g., +28 VDC) of the retrofit autothrottle controller 810 when the automatic throttle function of the engaged state 612 (FIG. 6) is active.

When the autothrottle is in engaged state 612, autothrottle controller 810 outputs virtual PCL position RVDT signals in line with the received FADEC RVDT Excitation voltage, the current autothrottle mode of operation, and the pilot-selected thrust target via the user interface. These autothrottle-controlled virtual RVDT signals are routed to the FADEC via the RRBs to provide a autothrottle-commanded PCL position to the FADEC. The performance of the engine is monitored by the FADEC and provided to the autothrottle controller 810 via a data bus as shown, which includes output of engine data.

An unlikely failure condition of the +28 VDC switched power outputs of the autothrottle controller 810 causing the +28 VDC output from the ISU to be maintained even when the automatic throttle function of the autothrottle controller 810 has NOT been engaged is mitigated by using a manually-controlled switch within the retrofit user interface UI switch/annunciator to break the connection between the coils of the relays in the RRBs and the +28 VDC output of the autothrottle controller 810.

A failure that causes the normally-open contact of a single, individual, relay to fuse in the closed position is mitigated by using other individual relays to switch the other RVDT signals. In this way, if a single relay fails, the other relays offer a path for the redundant RVDT signals.

The retrofit interface as described in this example advantageously facilitates its installation, without any substantial rewiring and supports the potential of a completed installation of a retrofit autothrottle system in a single day for an existing FADEC-equipped aircraft.

ADDITIONAL NOTES AND EXAMPLES

Example 1 is a system for controlling an autothrottle of an aircraft equipped with a full-authority digital engine control (FADEC) system having a command input that receives sensed power-control input (PCL) position signaling indicative of a manual throttle setting, the system comprising: an autothrottle controller including processing circuitry, memory, and input/output facilities, the autothrottle controller operative to execute instructions including an autothrottle control program, the autothrottle controller including an input operative to receive sensed PCL position signaling and to output automated power command signaling; and a FADEC interface electrically coupled to the autothrottle controller and to the FADEC system, and controllable by the autothrottle controller to select from among the sensed PCL position signaling and the automated power command signaling to be coupled to the command input; wherein the autothrottle control program, when executed, causes the autothrottle controller to determine a control-target setting and to generate the automated power-command signaling according to the control-target setting when the system is in an engaged state for autothrottle control; and wherein the automated power command signaling is generated by the autothrottle controller according to the autothrottle control program, and is synthesized to virtualize electrical characteristics of the sensed PCL position signaling such that the automated power command signaling is recognizable by the FADEC system as sensed PCL position signaling.

In Example 2, the subject matter of Example 1 includes, wherein the FADEC interface comprises an electrical selector switch which defaults to selecting the sensed PCL position signaling when the system is not in an engaged state for autothrottle control.

In Example 3, the subject matter of Example 2 includes, wherein the autothrottle controller and FADEC interface are arranged for safe failure wherein the electrical selector switch selects the automated power command signaling only when the autothrottle controller is fully functional and engaged.

In Example 4, the subject matter of Examples 1-3 includes, wherein the sensed PCL position signaling is produced by an angular position sensor arranged to detect an angular position of a manually-movable lever.

In Example 5, the subject matter of Example 4 includes, wherein the angular position sensor is operative to receive an excitation signal from the FADEC system, and wherein the excitation signal is also received by the autothrottle controller.

In Example 6, the subject matter of Examples 1-5 includes, wherein the automated power command signaling is generated and automatically adjusted by the autothrottle controller according to the autothrottle control program independently of the manual throttle setting.

In Example 7, the subject matter of Examples 1-6 includes, wherein the input of the autothrottle controller that is operative to receive sensed PCL position signaling receives the same sensed PCL position signaling as received by the FADEC system.

In Example 8, the subject matter of Examples 1-7 includes, wherein the autothrottle controller is operative to execute instructions including a FADEC interface process that, when executed, causes the autothrottle controller to learn the electrical characteristics of the sensed PCL position signaling during configuration of the autothrottle controller for the aircraft.

In Example 9, the subject matter of Examples 1-8 includes, wherein the autothrottle controller is operative to generate an autothrottle engagement signal when the system is in the engaged state for autothrottle control, and wherein the FADEC interface is operative to select from among the sensed PCL position signaling and the automated power command signaling to be coupled to the command input in response to the autothrottle engagement signal.

In Example 10, the subject matter of Examples 1-9 includes, wherein the autothrottle controller is operative to transition out of the engaged state for autothrottle control in response to a sensed change of manual throttle setting based on the sensed PCL position signaling.

Example 11 is a method for controlling an autothrottle of an aircraft equipped with a full-authority digital engine control (FADEC) system having a command input that receives sensed power-control input (PCL) position signaling indicative of a manual throttle setting, the method comprising: executing, by an autothrottle controller, instructions including an autothrottle control program, including determining a control-target setting; receiving, by the autothrottle controller, sensed PCL position signaling; outputting, by the autothrottle controller, automated power command signaling that is based on the control-target setting, including synthesizing electrical characteristics of the sensed PCL position signaling such that the automated power command signaling is recognizable by the FADEC system as sensed PCL position signaling; and electrically selecting, under control of the autothrottle controller, from among the sensed PCL position signaling and the automated power command signaling, a throttle command signal to be coupled to the command input.

In Example 12, the subject matter of Example 11 includes, wherein the electrically selecting includes defaulting to selecting the sensed PCL position signaling when the autothrottle control program is not in an engaged state for autothrottle control.

In Example 13, the subject matter of Examples 11-12 includes, producing the sensed PCL position signaling by an angular position sensor arranged to detect an angular position of a manually-movable control.

In Example 14, the subject matter of Example 13 includes, receiving, by the angular position sensor, an excitation signal from the FADEC system; receiving, by the autothrottle controller, the excitation signal.

In Example 15, the subject matter of Examples 11-14 includes, wherein outputting the automated power command signaling includes automatically adjusting the automated power command signaling by the autothrottle controller according to the autothrottle control program independently of the manual throttle setting.

In Example 16, the subject matter of Examples 11-15 includes, wherein receiving the sensed PCL position signaling includes receiving the same sensed PCL position signaling as received by the FADEC system.

In Example 17, the subject matter of Examples 11-16 includes, learning, by the autothrottle controller, electrical characteristics of the sensed PCL position signaling during configuration of the autothrottle controller for the aircraft.

In Example 18, the subject matter of Examples 11-17 includes, generating an autothrottle engagement signal when the autothrottle control program is in an engaged state for autothrottle control; and wherein selecting from among the sensed PCL position signaling and the automated power command signaling to be coupled to the command input is performed in response to the autothrottle engagement signal.

In Example 19, the subject matter of Examples 11-18 includes, transitioning the autothrottle control program out of the engaged state for autothrottle control in response to a sensed change of manual throttle setting based on the sensed PCL position signaling.

Example 20 is at least one machine-readable medium including instructions that, when executed by processing circuitry, cause the processing circuitry to perform operations to implement of any of Examples 1-19.

Example 21 is an apparatus comprising means to implement of any of Examples 11-19.

Example 22 is a system to implement of any of Examples 11-19.

The embodiments above are intended to be illustrative and not limiting. Additional embodiments are within each claim that does not expressly exclude such subject matter. In addition, although aspects of the present invention have been described with reference to particular embodiments, those skilled in the art will recognize that changes may be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents apply only to the incorporated subject matter, and not to any of the subject matter directly present herein.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A system for controlling an autothrottle of an aircraft equipped with a full-authority digital engine control (FADEC) system having a command input that receives sensed power-control input (PCL) position signaling indicative of a manual throttle setting, the system comprising:

an autothrottle controller including processing circuitry, memory, and input/output facilities, the autothrottle controller operative to execute instructions including an autothrottle control program, the autothrottle controller including an input operative to receive sensed PCL position signaling and to output automated power command signaling; and a FADEC interface electrically coupled to the autothrottle controller and to the FADEC system, and controllable by the autothrottle controller to select from among the sensed PCL position signaling and the automated power command signaling to be coupled to the command input;

wherein the autothrottle control program, when executed, causes the autothrottle controller to determine a control-target setting and to generate the automated power-command signaling according to the control-target setting when the system is in an engaged state for autothrottle control; and wherein the automated power command signaling is generated by the autothrottle controller according to the autothrottle control program, and is synthesized to virtualize electrical characteristics of the sensed PCL position signaling such that the automated power command signaling is recognizable by the FADEC system as sensed PCL position signaling.

2. The system of claim 1, wherein the FADEC interface comprises an electrical selector switch which defaults to selecting the sensed PCL position signaling when the system is not in an engaged state for autothrottle control.

3. The system of claim 2, wherein the autothrottle controller and FADEC interface are arranged for safe failure wherein the electrical selector switch selects the automated power command signaling only when the autothrottle controller is fully functional and engaged.

4. The system of claim 1, wherein the sensed PCL position signaling is produced by an angular position sensor arranged to detect an angular position of a manually-movable lever.

5. The system of claim 4, wherein the angular position sensor is operative to receive an excitation signal from the FADEC system, and wherein the excitation signal is also received by the autothrottle controller.

6. The system of claim 1, wherein the automated power command signaling is generated and automatically adjusted by the autothrottle controller according to the autothrottle control program independently of the manual throttle setting.

7. The system of claim 1, wherein the input of the autothrottle controller that is operative to receive sensed PCL position signaling receives the same sensed PCL position signaling as received by the FADEC system.

8. The system of claim 1, wherein the autothrottle controller is operative to execute instructions including a FADEC interface process that, when executed, causes the autothrottle controller to learn the electrical characteristics of the sensed PCL position signaling during configuration of the autothrottle controller for the aircraft.

9. The system of claim 1, wherein the autothrottle controller is operative to generate an autothrottle engagement signal when the system is in the engaged state for autothrottle control, and wherein the FADEC interface is operative to select from among the sensed PCL position signaling and the automated power command signaling to be coupled to the command input in response to the autothrottle engagement signal.

10. The system of claim 1, wherein the autothrottle controller is operative to transition out of the engaged state for autothrottle control in response to a sensed change of manual throttle setting based on the sensed PCL position signaling.

11. A method for controlling an autothrottle of an aircraft equipped with a full-authority digital engine control (FADEC) system having a command input that receives sensed power-control input (PCL) position signaling indicative of a manual throttle setting, the method comprising:
    executing, by an autothrottle controller, instructions including an autothrottle control program, including determining a control-target setting;
    receiving, by the autothrottle controller, sensed PCL position signaling;
    outputting, by the autothrottle controller, automated power command signaling that is based on the control-target setting, including synthesizing electrical characteristics of the sensed PCL position signaling such that the automated power command signaling is recognizable by the FADEC system as sensed PCL position signaling; and
    electrically selecting, under control of the autothrottle controller, from among the sensed PCL position signaling and the automated power command signaling, a throttle command signal to be coupled to the command input.

12. The method of claim 11, wherein the electrically selecting includes defaulting to selecting the sensed PCL position signaling when the autothrottle control program is not in an engaged state for autothrottle control.

13. The method of claim 11, further comprising:
    producing the sensed PCL position signaling by an angular position sensor arranged to detect an angular position of a manually-movable control.

14. The method of claim 13, further comprising:
    receiving, by the angular position sensor, an excitation signal from the FADEC system;
    receiving, by the autothrottle controller, the excitation signal.

15. The method of claim 11, wherein outputting the automated power command signaling includes automatically adjusting the automated power command signaling by the autothrottle controller according to the autothrottle control program independently of the manual throttle setting.

16. The method of claim 11, wherein receiving the sensed PCL position signaling includes receiving the same sensed PCL position signaling as received by the FADEC system.

17. The method of claim 11, further comprising:
    learning, by the autothrottle controller, electrical characteristics of the sensed PCL position signaling during configuration of the autothrottle controller for the aircraft.

18. The method of claim 11, further comprising:
    generating an autothrottle engagement signal when the autothrottle control program is in an engaged state for autothrottle control; and
    wherein selecting from among the sensed PCL position signaling and the automated power command signaling to be coupled to the command input is performed in response to the autothrottle engagement signal.

19. The method of claim 11, further comprising:
    transitioning the autothrottle control program out of the engaged state for autothrottle control in response to a sensed change of manual throttle setting based on the sensed PCL position signaling.

* * * * *